(12) United States Patent
Zhao et al.

(10) Patent No.: US 11,163,610 B2
(45) Date of Patent: Nov. 2, 2021

(54) METHOD, DEVICE, AND COMPUTER PROGRAM PRODUCT FOR ASSIGNING TASKS TO DEDICATED PROCESSING RESOURCES

(71) Applicant: EMC IP Holding Company LLC, Hopkinton, MA (US)

(72) Inventors: Junping Zhao, Beijing (CN); Jinpeng Liu, Shanghai (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 192 days.

(21) Appl. No.: 16/415,746

(22) Filed: May 17, 2019

(65) Prior Publication Data

US 2020/0133735 A1 Apr. 30, 2020

(30) Foreign Application Priority Data

Oct. 31, 2018 (CN) .......................... 201811288666.6

(51) Int. Cl.
  *G06F 9/50* (2006.01)
  *G06F 9/48* (2006.01)
  (Continued)

(52) U.S. Cl.
  CPC .......... *G06F 9/5044* (2013.01); *G06F 9/4881* (2013.01); *G06F 9/5083* (2013.01);
  (Continued)

(58) Field of Classification Search
  CPC ...... G06F 16/22; G06F 16/245; G06F 9/4881; G06F 9/5044; G06F 9/5083; G06N 20/00;
  (Continued)

(56) References Cited

U.S. PATENT DOCUMENTS 9,087,161 B1 * 7/2015 Diamond ............ G06F 13/4081
10,102,015 B1 * 10/2018 Gordon ................. G06F 8/4441
(Continued)

OTHER PUBLICATIONS

H. Sivaraman et al., "Performance Comparison of Containerized Machine Learning Applications Running Natively with Nvidia vGPUs vs. in a VM—Episode 4," blogs.vmware.com/performance/2017/11/machine-learning-virtualized-containers-nvidia-vgpu-performance.html, Nov. 29, 2017, 5 pages.

(Continued)

*Primary Examiner* — Jorge A Chu Joy-Davila
(74) *Attorney, Agent, or Firm* — Ryan, Mason & Lewis, LLP (57) ABSTRACT

A method comprises obtaining hardware information of a plurality of dedicated processing resources, wherein the plurality of dedicated processing resources comprises a first dedicated processing resource and a second dedicated processing resource, and the hardware information comprises first hardware information of the first dedicated processing resource and second hardware information of the second dedicated processing resource. The method further comprises generating a first task based on the first hardware information and a second task based on the second hardware information, and allocating the first task to the first dedicated processing resource and the second task to the second dedicated processing resource. For task scheduling in heterogeneous dedicated processing resources (for example, accelerator devices) scenario, the method generates corresponding kernel codes according to different hardware capabilities. Thus, dynamic optimization for the heterogeneous dedicated processing resources is implemented, thereby improving resource utilization rate and execution efficiency.

20 Claims, 8 Drawing Sheets

(51) Int. Cl.
*G06N 20/00* (2019.01)
*G06F 16/245* (2019.01)
*G06F 16/22* (2019.01)

(52) U.S. Cl.
CPC ............ *G06F 16/22* (2019.01); *G06F 16/245* (2019.01); *G06N 20/00* (2019.01)

(58) Field of Classification Search
CPC .... G06N 3/0445; G06N 3/0454; G06N 3/063; G06N 3/088
See application file for complete search history.

(56) References Cited

U.S. PATENT DOCUMENTS

| | | | | |
|---|---|---|---|---|
| 2009/0217275 A1* | 8/2009 | Krishnamurthy | ..... | G06F 9/5077 718/102 |
| 2010/0095152 A1* | 4/2010 | Darrington | ......... | G06F 11/1438 714/19 |
| 2010/0329564 A1* | 12/2010 | Hervas | ...................... | G06T 1/20 382/190 |
| 2011/0022870 A1* | 1/2011 | McGrane | ................ | G06F 1/324 713/340 |
| 2012/0054770 A1* | 3/2012 | Krishnamurthy | ..... | G06F 9/4893 718/105 |
| 2013/0036409 A1* | 2/2013 | Auerbach | ............... | G06F 8/456 717/140 |
| 2013/0160016 A1* | 6/2013 | Gummaraju | .......... | G06F 9/5044 718/102 |
| 2015/0199787 A1* | 7/2015 | Pechanec | .............. | G06F 9/5044 345/522 |
| 2018/0121180 A1* | 5/2018 | Chen | ..................... | G06F 9/3836 |
| 2018/0165788 A1* | 6/2018 | Ci | .............................. | G06T 1/20 |
| 2018/0341525 A1* | 11/2018 | Gupta | ..................... | G06F 9/505 |
| 2018/0357746 A1* | 12/2018 | Parke | ..................... | G06F 9/448 |
| 2019/0384370 A1* | 12/2019 | Kim | ..................... | G06F 1/3225 |

OTHER PUBLICATIONS

J. Appleyard et al., "Programming Tensor Cores in CUDA 9," devblogs.nvidia.com/programming-tensor-cores-cude-9/, Oct. 17, 2017, 9 pages.

Intel.ai, "nGraph," intel.ai/ngraph/, downloaded May 16, 2019, 4 pages.

Kubernetes.io, "Schedule GPUs—Kubernetes," kubernetes.io/docs/tasks/manage-gpus/scheduling-gpus/, Feb. 17, 2019, 5 pages.

Tensorflow.org, "XLA is a Compiler that Optimizes TensorFlow Computations," tensorflow.org/xla/, downloaded May 16, 2019, 1 page.

T. Chen et al., "TVM: An End to End IR Staclk for Deploying Deep Learning Workloads on Hardware Platforms," tvm.ai/2017/08/17/tvm-release-announcement.html, Aug. 17, 2017, 7 pages.

* cited by examiner

METHOD, DEVICE, AND COMPUTER PROGRAM PRODUCT FOR ASSIGNING TASKS TO DEDICATED PROCESSING RESOURCES

RELATED APPLICATION(S)

The present application claims priority to Chinese Patent Application No. 201811288666.6, filed Oct. 31, 2018, and entitled "Method, Device, and Computer Program Product for Assigning Tasks to Dedicated Processing Resources," which is incorporated by reference herein in its entirety.

FIELD

Embodiments of the present disclosure generally relate to the field of computer technologies, and more particularly to a method, a device and a computer program product for assigning tasks to dedicated processing resources.

BACKGROUND

Dedicated processing resources are processing resources having dedicated usages such as graphics processing units (GPUs) and field programmable gate arrays (FPGAs). A GPU is a core processor dedicated to graphics or images, and its main task is to speed up graphics processing. A GPU is widely used as an accelerator for many applications, such as machine learning applications and deep learning applications, due to its high-performance advantages (such as multi-core and suitability for matrix operations). An FPGA is a semi-customized circuit in the field of application-specific integrated circuits (ASIC), which not only solves the shortcomings of customized circuits, but also overcomes the drawback associated with the limited number of original programmable device gate circuits. An FPGA has significant acceleration capabilities and is therefore suitable for performing deep learning tasks.

When dealing with high-performance computing tasks, to improve parallelism and processing speed, multiple dedicated processing resources are usually required to participate together. For example, a total task is divided into several subtasks, which are then executed separately by a number of dedicated processing resources. In general, the cost of dedicated processing resources is relatively expensive, and users may still be using some old dedicated processing resources when purchasing new dedicated processing resources. Therefore, during the execution of a high-performance computing task, there may be a situation wherein multiple different types of multiple dedicated processing resources are processing simultaneously.

SUMMARY

Embodiments of the present disclosure provide a method, a device and a computer program product for allocating tasks to dedicated processing resources.

According to an aspect of the disclosure, there is provided a method for assigning tasks to dedicated processing resources. The method comprises obtaining hardware information of a plurality of dedicated processing resources, wherein the plurality of dedicated processing resources comprises a first dedicated processing resource and a second dedicated processing resource, and the hardware information comprises first hardware information of the first dedicated processing resource and second hardware information of the second dedicated processing resource. The method further comprises generating a first task based on the first hardware information and a second task based on the second hardware information, and allocating the first task to the first dedicated processing resource and the second task to the second dedicated processing resource.

According to another aspect of the present disclosure, there is provided a device for assigning tasks to dedicated processing resources. The device comprises a processing unit and a memory coupled to the processing unit and storing instructions thereon. The instructions, when executed by the processing unit, perform the acts comprising obtaining hardware information of a plurality of dedicated processing resources, wherein the plurality of dedicated processing resources comprises a first dedicated processing resource and a second dedicated processing resource, and the hardware information comprises first hardware information of the first dedicated processing resource and second hardware information of the second dedicated processing resource. The acts further comprise generating a first task based on the first hardware information and a second task based on the second hardware information, and allocating the first task to the first dedicated processing resource and the second task to the second dedicated processing resource.

According to a further aspect of the present disclosure, there is provided a computer program product that is tangibly stored on a non-transient computer readable medium and comprises machine-executable instructions. The machine-executable instructions, when executed, cause a computer to execute a method or process according to embodiments of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other features, advantages and aspects of embodiments of the present disclosure will be made more apparent by describing the present disclosure in more detail with reference to figures. In the figures, the same or like reference signs represent the same or like elements.

DETAILED DESCRIPTION

Preferred embodiments of the present disclosure will be described below in more detail with reference to figures. Although figures show preferred embodiments of the present disclosure, it should be appreciated that the present disclosure may be implemented in various forms and should not be limited by embodiments stated herein. On the contrary, these embodiments are provided to make the present disclosure more apparent and complete, and to convey the scope of the present disclosure entirely to those skilled in the art.

As used herein, the term "includes" and its variants are to be read as open terms that mean "includes, but is not limited to." Unless otherwise specified, the term "or" represents "and/or". The term "based on" is to be read as "based at least in part on." The term "an implementation" is to be read as "at least one implementation." The term "another implementation" is to be read as "at least one other implementation." Terms "first" and "second" may refer to different or identical objects, unless otherwise it is explicitly specified that they refer to different objects.

Dedicated processing resources (such as accelerator devices) are widely used as accelerators for many applications, such as machine learning applications and deep neural network (DNN) learning applications, due to their high-performance advantages (such as multi-core and suitability for matrix operations). Generally, for high-performance computing tasks, multiple dedicated processing resources are usually required to be executed concurrently. These multiple dedicated processing resources may have different device types due to the different purchase orders. For example, when the user purchased a new dedicated processing resource this year, the user may still be using the old dedicated processing resources purchased last year. Therefore, during the execution of high-performance computing tasks, there may be a situation wherein multiple different types of multiple dedicated processing resources are processing simultaneously. According to traditional methods, for given high-performance computing tasks, the same kernel codes are generated for each dedicated processing resource, regardless of the hardware differences between the different dedicated processing resources, and traditional methods do not perform any optimization for the heterogeneous dedicated processing resource cluster. Therefore, the traditional method cannot utilize different hardware resources efficiently and has a low execution efficiency.

To this end, embodiments of the present disclosure propose a solution for dynamic optimization of heterogeneous dedicated processing resources. For task scheduling in a heterogeneous dedicated processing resources (for example, accelerator devices) scenario, embodiments of the present disclosure generate corresponding kernel codes according to different hardware capabilities. Thus, dynamic optimization for the heterogeneous dedicated processing resources can be implemented, thereby improving resource utilization rate and execution efficiency.

The basic principles and several example implementations of the present disclosure are described below with reference to FIGS. 1-8. It should be appreciated that these example embodiments are given only to enable those skilled in the art to better understand and thereby implement embodiments of the present disclosure, not to limit the scope of the present disclosure in any manner.

Figure 1:
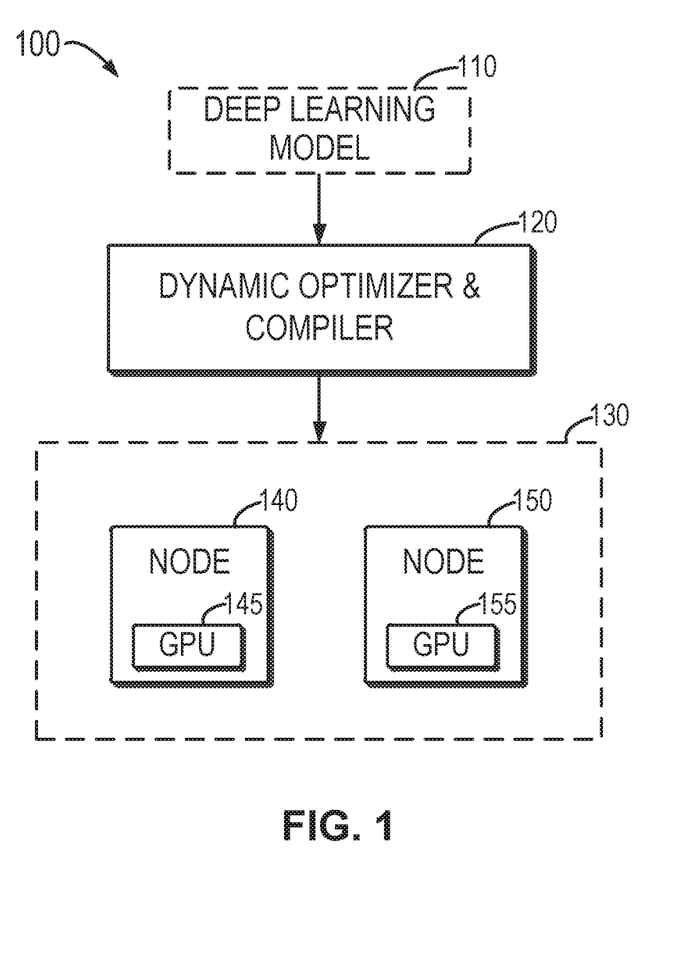
FIG. 1 illustrates a schematic diagram of an example architecture for allocating tasks to heterogeneous dedicated processing resources dynamically according to embodiments of the present disclosure.

FIG. 1 illustrates a schematic diagram of example architecture 100 for dynamically allocating tasks to dedicated processing resources according to embodiments of the present disclosure. As shown in FIG. 1, the example architecture 100 includes a deep learning model 110, a dynamic optimizer and compiler 120, and a heterogeneous dedicated processing resource cluster 130, and the dedicated processing resource cluster 130 includes a plurality of dedicated processing resources located at a plurality of nodes 140 and 150, for example, accelerator devices such as one or more graphics processing units (GPUs) or one or more field programmable gate arrays (FPGAs). The dedicated processing resource cluster 130 may be deployed in a data center or cloud environment, and the GPU 145 (at node 140) and the GPU 155 (at node 150) may be of different types, referred to as a heterogeneous GPU scenario. Heterogeneity not only refers to dedicated processing resources of different brands, but also refers to different types of dedicated processing resources of the same brand.

Heterogeneous clusters are very common in the real world because customers constantly buy new hardware at any time and thus a hybrid hardware cluster occurs. In general, it is desirable to schedule tasks freely on any device in the cluster. In addition, manufacturers of accelerator devices will not constantly develop new hardware devices. For example, NVIDIA's new GPU V100 has a special chip Tensor Core that supports Matrix Multiply Accumulate (MMA), which has significantly improved performance compared to the previous generation.

The deep learning model 110 may be a machine learning model of any deep learning model including, but not limited to, Convolutional Neural Networks (CNN), Recurrent Neural Networks (RNN), Long Short-Term Memory (LSTM) Networks, and Generative Adversarial Networks (GAN), and so on. After initiating a certain deep learning task to be executed in a distributed way, the dynamic optimizer and compiler 120 may invoke several dedicated processing resources in the dedicated processing resource cluster 130 to execute this deep learning task concurrently.

According to embodiments of the present disclosure, the dynamic optimizer and compiler 120 may obtain hardware information of these dedicated processing resources before assigning tasks to respective dedicated processing resources, and allocate corresponding kernel codes according to respective hardware information, so as to implement dynamic optimization for heterogeneous dedicated processing resources. For example, it is possible to assign more tasks to a better-performing GPU or assign a specific type of task to a new GPU that supports a certain feature. Furthermore, embodiments of the present disclosure may be implemented as a plug-in in an existing framework (e.g., TensorFlow XLA, TVM or nGraph). In addition, for hybrid scenarios with different types of accelerator devices, embodiments of the present disclosure can more sufficiently use hardware capabilities of various accelerators.

It should be understood that although depictions are presented by using GPU as an example of a dedicated processing resource, other types of dedicated processing resources are also possible, for example, an FPGA and so on.

Figure 2:
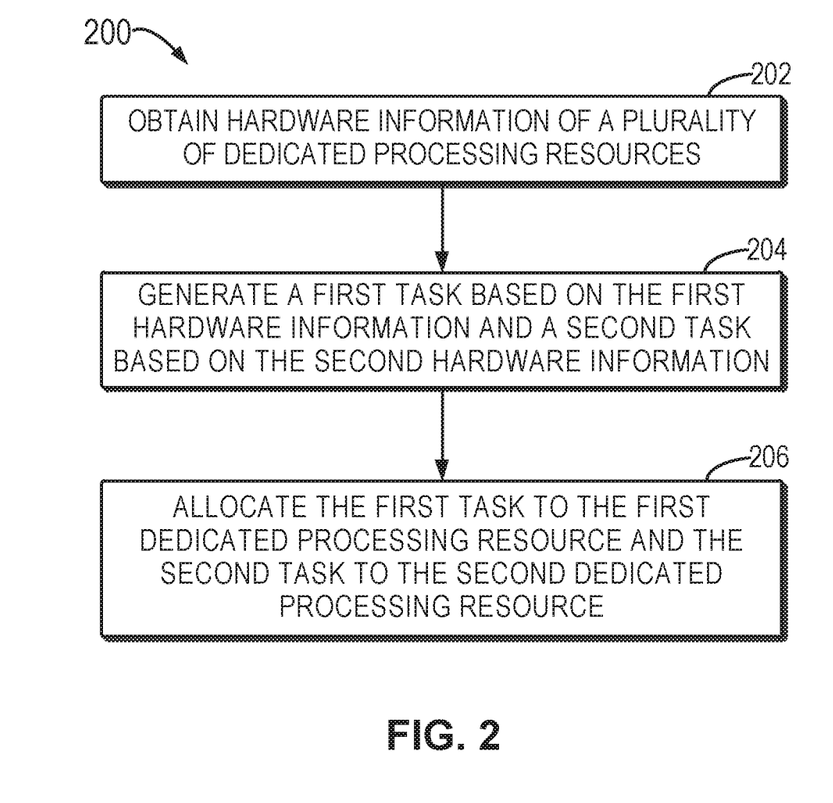
FIG. 2 illustrates a flow chart of a method for assigning tasks to dedicated processing resources according to embodiments of the present disclosure.

FIG. 2 illustrates a flow chart of a method 200 for assigning tasks to dedicated processing resources in accordance with embodiments of the present disclosure. It should be understood that the method 200 may be performed by the dynamic optimizer and compiler 120 as described above with respect to FIG. 2.

At 202, hardware information of a plurality of dedicated processing resources is obtained, wherein the plurality of dedicated processing resources includes a first dedicated processing resource and a second dedicated processing resource, and the hardware information includes first hardware information of the first dedicated processing resource and second hardware information of the second dedicated processing resource. For example, the dynamic optimizer and compiler 120 as described with reference to FIG. 1 obtains hardware information (such as information including GPU type) of the GPU 145 and GPU 155 that will participate in a certain high-performance computing task after receiving this certain high-performance computing task. Generally, in a heterogeneous GPU scenario, the types of at least two GPUs are different.

At 204, a first task is generated based on the first hardware information, and a second task is generated based on the second hardware information. For example, the dynamic optimizer and compiler 120 compiles a first task (such as a subtask of the entire high-performance computing task, which may be a function or kernel codes to be executed on the GPU) according to the type of GPU 145, and compiles the second task according to the type of GPU 155.

At 206, a first task is assigned to a first dedicated processing resource, and a second task is assigned to a second dedicated processing resource. The subtasks (such as kernel code) compiled at the dynamic optimizer and compiler 120 are respectively assigned to corresponding GPUs for respective execution on the respective GPUs. Therefore, according to method 200 of embodiments of the present disclosure, corresponding execution tasks are generated according to different hardware capabilities, for the task scheduling in a heterogeneous dedicated processing resource scenario. Thus, a dynamic optimization algorithm can be implemented to match the capacity of hardware, thereby improving the rate of resource utilization and execution efficiency.

Moreover, in one aspect, embodiments of the present disclosure are able to maximize the utilization of existing heterogeneous dedicated processing resources. Although the scheduler may try its best (but cannot guarantee) to allocate the same kind of resources, it is still valuable and inevitable to use heterogeneous resources, so embodiments of the present disclosure can provide more flexible task scheduling (such as removing the limit of scheduling the same type processing resources). In another aspect, embodiments of the present disclosure may dynamically discover the functions of dedicated processing resources and optimize operators. Obviously, different physical GPUs or vGPUs (virtual GPUs) may represent very different computing capabilities, so GPU or vGPU functionality needs to be discovered dynamically. In addition, features such as Tensor Core require a special application programming interface (API) to enable. For example, if two types of GPUs are assigned to a certain task, it is optimal to enable Tensor Core on a GPU with Tensor Core so as to obtain a higher performance, which uses a special cuBLAS or cuDNN implementation to compile the MMA operator. This means that different kernel implementations run on different GPU devices. Moreover, embodiments of the present disclosure nearly do not modify the model logic, and all optimizations may be hidden inside, and transparent to the data scientist, without changing the existing model logic, nor affecting the final accuracy.

Figure 3:
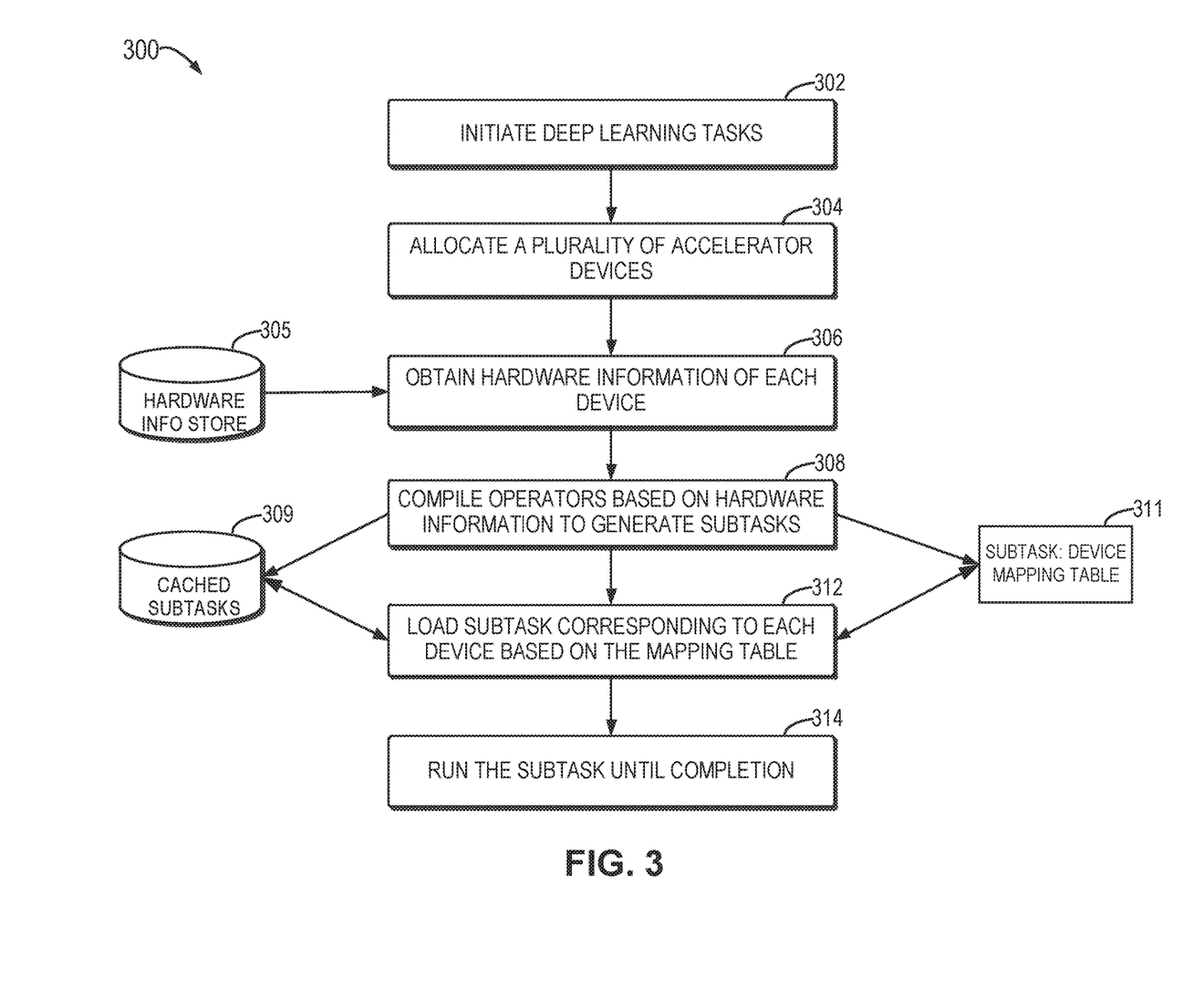
FIG. 3 illustrates a flow chart of an example process for performing deep learning tasks using dedicated processing resources according to embodiments of the present disclosure.

FIG. 3 illustrates a flow chart of a process 300 for performing deep learning tasks using dedicated processing resources in accordance with embodiments of the present disclosure. The process 300 depicted in FIG. 3 may be one example detailed implementation of the method 200 depicted in FIG. 2. In order to facilitate a clearer description of some example embodiments of the present disclosure, the process 300 of FIG. 3 is described in conjunction with FIGS. 4-7.

At 302, a high-performance computing task is initiated. For example, the application may create a new deep learning task based on the TVM framework. When a user initiates a deep learning task, such as distributed deep learning training on TensorFlow, the following input information is usually required:

Model information: models such as ResNet50;
Information about training min-batch size, how many batch steps to train, learning rate and so on;
Input data: the location of the training data, such as NFS or HDFS shared storage;
GPU devices: which node(s) and GPU are used to run the training job, usually they can be granted by some scheduler such as Kubernetes or Mesos or Cloud-Foundry, such as IP1: GPU0, IP1: GPU1, IP2: GPU0, IP2: GPU1 and so on.

Considering multiple deep learning frameworks such as TensorFlow, MXNet, Caffe, and PyTorch, as well as many accelerators, to better manage training models in a more unified manner and to make models run smoothly and efficiently on different types of hardware, even in mobile phones, it is possible to provide an intermediate representation (IR) of the model as a computation graph, and then models or the graph is compiled using JIT (just-in-time) technology to generate optimized byte codes for special target hardware. Those dynamic compilers can lower a high-level specification of a deep learning program down to low-level optimized codes for any hardware back-end, such as small kernel fusion, auto differentiation, parameter compression, memory optimization and so on.

Figure 4:
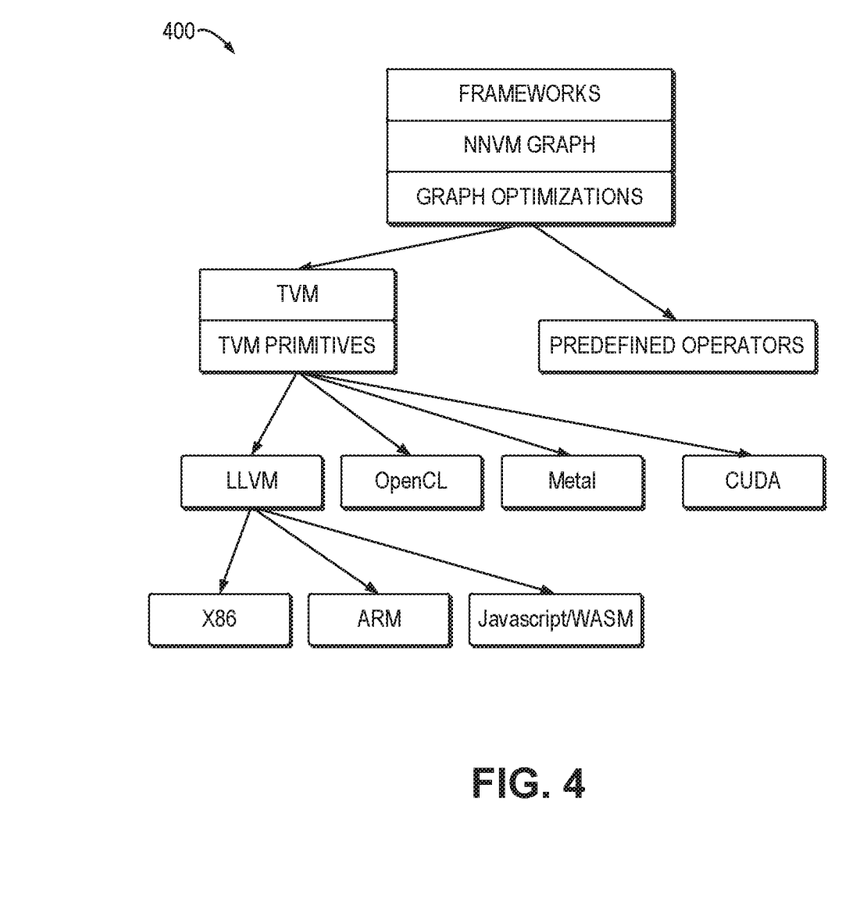
FIG. 4 illustrates a schematic diagram of intermediate representation and optimization for various hardware backends according to an embodiment of the present disclosure.

For example, FIG. 4 illustrates a schematic diagram 400 of intermediate representation and optimization for various hardware backends in accordance with an embodiment of the present disclosure. TVM is an open deep learning compiler stack for CPUs, GPUs, and other dedicated accelerators, and it is intended to reduce the gap between deep learning frameworks and performance or efficiency-oriented hardware backends. With TVM, the deep learning models may be assembled into the smallest deployable modules of various hardware backends, allowing deep learning tasks to be easily running on mobile phones, embedded devices and even browsers with a small amount of extra work. TVM also provides a unified optimization framework for deep learning workloads on multiple hardware platforms, including dedicated accelerators that rely on new computational primitives. By adopting the common philosophy of the compiler community and providing two intermediate characterization layers, the advanced deep learning algorithms are effectively reduced to multiple hardware backends. As shown in FIG. 4, it contains a TVM toolkit for optimization primitives such as LLVM (such as x86, ARM, Javascript), OpenCL, Metal, and CUDA. Therefore, TVM proposes a unified intermediate representation (IR) stack that bridges the gap between a productivity-centric deep learning framework and performance or efficiency-oriented hardware backends.

At 304, a plurality of accelerator devices is assigned to the high-performance computing tasks, for example, the dynamic optimizer and compiler 120 may allocate the GPU 145 and GPU 155 for performing the high-performance computing tasks. In an embodiment of the present disclosure, it may not be limited to assigning the same type of accelerator devices. Instead, according to embodiments of the present disclosure, different types of accelerator devices may be assigned to high-performance computing tasks.

Figure 5:
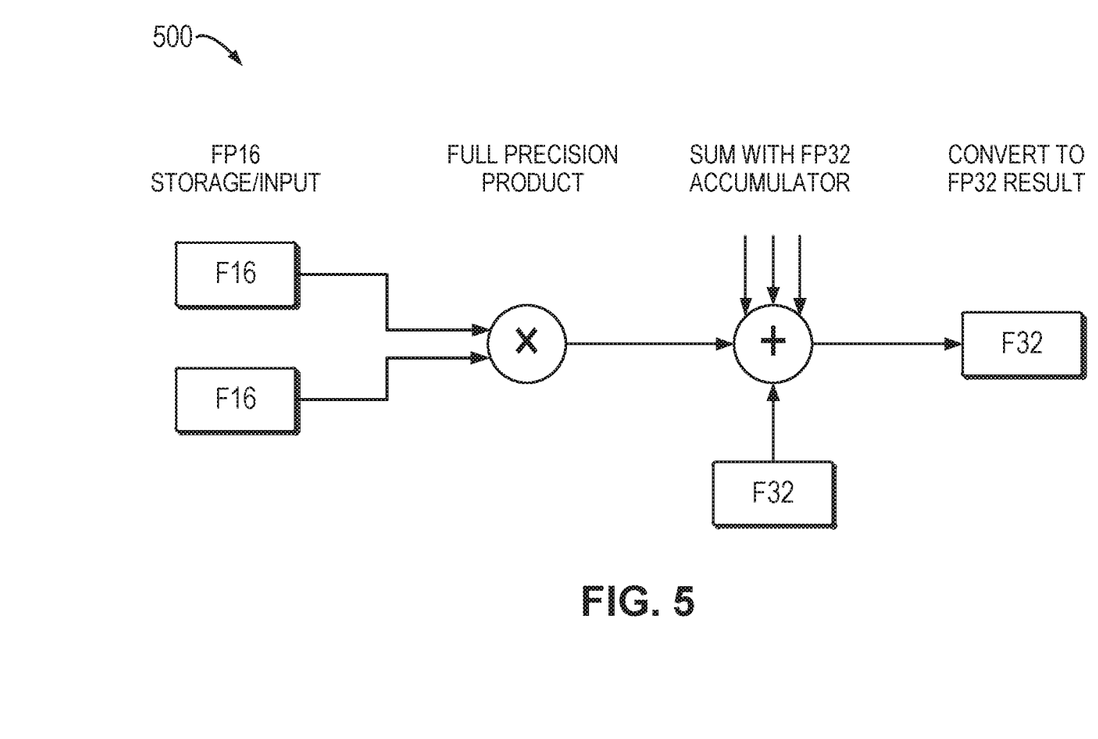
FIG. 5 illustrates a schematic diagram of a matrix multiply-accumulate operation.

At 306, hardware information of each accelerator device (such as a GPU) is obtained. Hardware information may include its identifier, type, and performance parameter(s). For example, performance parameters may include capabilities that the GPU has, such as the size of the memory, whether the virtual GPU is enabled, and whether MMA is enabled, and the like. For example, FIG. 5 shows a schematic diagram 500 of an MMA operation. Each Tensor Core performs 64 floating-point FMA mixed-precision operations per clock, and the FP16 input is multiplied by the full-precision product and accumulated with FP32. As shown in FIG. 5, eight Tensor cores in the streaming multiprocessor execute 1024 floating point operations per clock. Tensor Core runs on FP16 input data and accumulates with FP32. The FP16 multiplication produces a full-precision result that accumulates in the FP32 operation, where other products in a given dot product are 4×4×4 matrix multiplications, as shown in FIG. 5. Thus, for GPUs that enable or support specific functions (such as Tensor Core, which may speed up MMA), special implementations may be used to compile MMA operators to improve processing efficiency.

Figure 6:
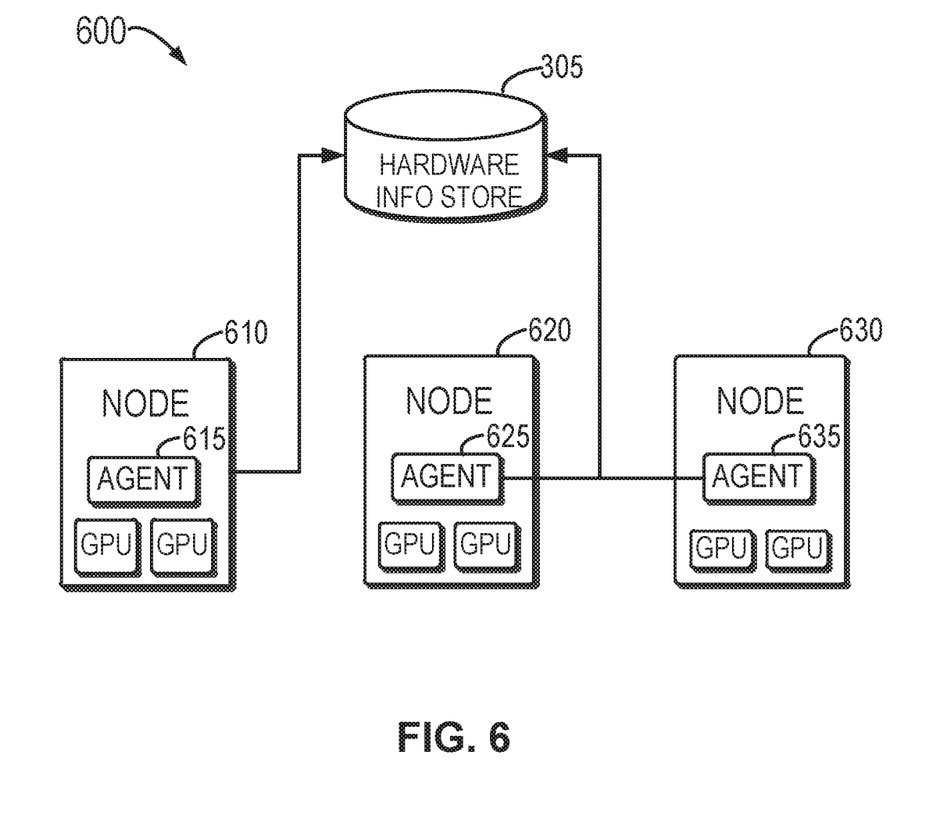
FIG. 6 illustrates a schematic diagram for collecting hardware information of dedicated processing resources according to embodiments of the present disclosure.

In some embodiments, the hardware information may be obtained in real time through the interface of the GPU. For example, after allocating GPUs participating in performing deep learning tasks, the hardware information of these GPUs may be acquired in real time at runtime. Alternatively, a hardware information store 305 may also be established to query and store hardware information of all GPUs in advance, and then hardware information is obtained from the hardware information store 305 when needed. For example, FIG. 6 illustrates a schematic diagram 600 of hardware information for collecting dedicated processing resources, in accordance with embodiments of the present disclosure. There are three nodes 610, 620, and 630, each of which includes two GPUs and an agent, and FIG. 6 illustrates agents 615, 625, and 635. The hardware information of the two GPUs in the node 610 may be obtained through the agent 615, the hardware information of the two GPUs in the node 620 may be obtained through the agent 625, and the hardware information of the two GPUs in the node 630 may be obtained through the agent 635, and then, the obtained hardware information may be stored in the hardware information store 305. In some embodiments, the hardware information of each GPU may be obtained periodically (for example, scan once every ten seconds), and if the hardware information of a certain GPU has not been recorded, it may be inserted into the hardware information store 305. If the hardware information of a certain GPU changes, the updated hardware information may be updated into the hardware information store 305. Table 1 below shows an example hardware information table.

TABLE 1

Example hardware information table

| Node IP address | local ID | Hardware type | Performance parameters |
| --- | --- | --- | --- |
| 192.168.2.45 | GPU 0 | Type 1 | Memory: 24 GB |
| 192.168.2.45 | GPU 1 | Type 1 | Memory: 24 GB |
| 192.168.2.46 | GPU 0 | Type 2 | Tensor Core: Y |
| 192.168.2.46 | GPU 1 | Type 2 | Tensor Core: Y |
| 192.168.2.47 | GPU 0 | Type 3 | vGPU: Y |
| 192.168.2.47 | GPU 1 | Type 3 | vGPU: Y |

As shown in Table 1, the hardware information table may include the IP (Internet Protocol) address of the node where each GPU is located, the local ID of each GPU, the hardware type of each GPU, and partial performance parameters of each GPU. In some embodiments, the IP address of the node plus the local ID of the GPU may constitute a unique identifier for each GPU. Performance parameters may indicate the size of the GPU's memory, whether the GUP enables Tensor Core, whether it enables virtual GPUs (vGPUs), and so on. The hardware information will guide the JIT compiler to build hardware-optimized low-level operators.

For example, there may be hardware-based GPU virtualization (such as NVIDIA's GRID) and software-based GPU virtualization (such as EMC's GPUaaS), and then applications may use logical GPUs (vGPUs) to provide self-defined functions of the core or processor aspects. In this case, it is desirable to know the actual capabilities of the GPU and then optimize the operators. For example, it is possible to choose the appropriate conversion algorithm to avoid allocating too much GPU memory.

Referring back to FIG. 3, at 308, operators are compiled based on hardware information to generate subtasks (such as kernel code) that are executed on respective accelerator devices. For example, it is possible to use an intermediate representation (IR) to extract and then compile the IR into the kernel codes optimized by the backend device. The generated subtasks may be cached to avoid repeated compilations, as shown at 309, and a mapping table between each subtask and a corresponding accelerator device (such as GPU) is recorded in memory, as shown at 311.

TABLE 2

Mapping table between subtasks and accelerator devices

| Task name | Subtask | Target device | Note |
| --- | --- | --- | --- |
| Task 1 | Kernel codes 1 | IP1: GPU0, IP1: GPU1 IP2: GPU0, IP2: GPU1 | All devices use the same kernel codes 1 |
| Task 2 | Kernel codes 2 | IP1: GPU0, IP1: GPU1 | Special GPUs uses the kernel codes 2 |
| Task 2 | Kernel codes 3 | IP2: GPU0, IP2: GPU1 | Other GPUs use the kernel codes 3 |

As shown in Table 2, the kernel codes of each subtask are associated with the GPU to be executed. For the high-performance computing task 1, all GPUs may use the same kernel codes 1. For the high-performance computing task 2, a specific type of GPU (because it enables a special new function) uses the kernel codes 2, while other types of GPUs use kernel codes 3.

Figure 7:
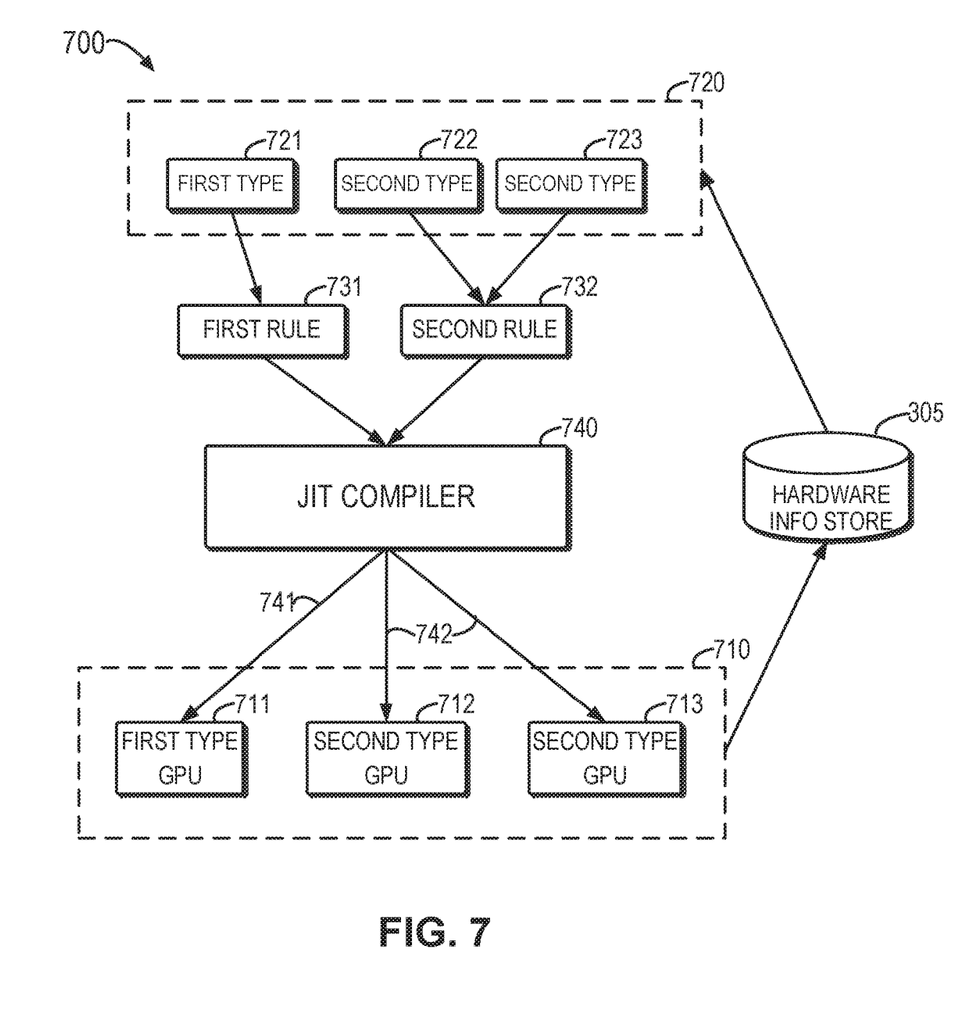
FIG. 7 illustrates a schematic diagram for dynamic compilation based on hardware information according to embodiments of the present disclosure.

FIG. 7 illustrates a schematic diagram 700 for dynamic compilation based on hardware information, in accordance with embodiments of the present disclosure. As shown in FIG. 7, a heterogeneous dedicated processing resource cluster 710 includes a first type of GPU 711 and a second type of GPU 712 and GPU 713. The hardware information of these GPUs may be obtained and stored in the hardware information store 305. Prior to compiling the operators, hardware information 720 (such as type) of each GPU may be obtained from hardware information store 305, such as GPU 711 is of a first type, as shown at 721, GPU 712 and GPU 713 are of a second type, as shown at 722 and 723. Next, different compilation rules may be used for different types, and the same compilation rules may be used for the same type. Thus, a JIT compiler 740 may use the first rule 731 to compile subtasks (such as kernel codes) to be executed on the first type of GPU 711, and use the second rule 732 to compile the kernel codes to be executed on the second type of GPU 712 and GPU 713. The JIT compiler 740 then assigns the first type of subtasks to the first type of GPU 711, as indicated by arrow 741, and assigns the second type of subtasks to the second type of GPUs 712 and 713, as indicated by arrows 742.

Referring back to FIG. 3, at 312, the subtasks (such as kernel codes) corresponding to each of the acceleration devices are loaded based on the mapping table, and then each subtask begins to run at 314 until completion. Next, each GPU may return its execution results, and then the deep learning model may combine these results to obtain final training results. For example, as for the deep learning task 1 in mapping table 2, each GPU device will load the same kernel codes 1. For deep learning task 2 in mapping table 2, some GPUs will load kernel codes 2 (which, for example, has been optimized for use with Tensor Core), while other GPUs will load kernel codes 3. Thus, in accordance with embodiments of the present disclosure, multiple GPUs will use different core implementations and provide the same functionality, but utilize different performance and resources.

Figure 8:
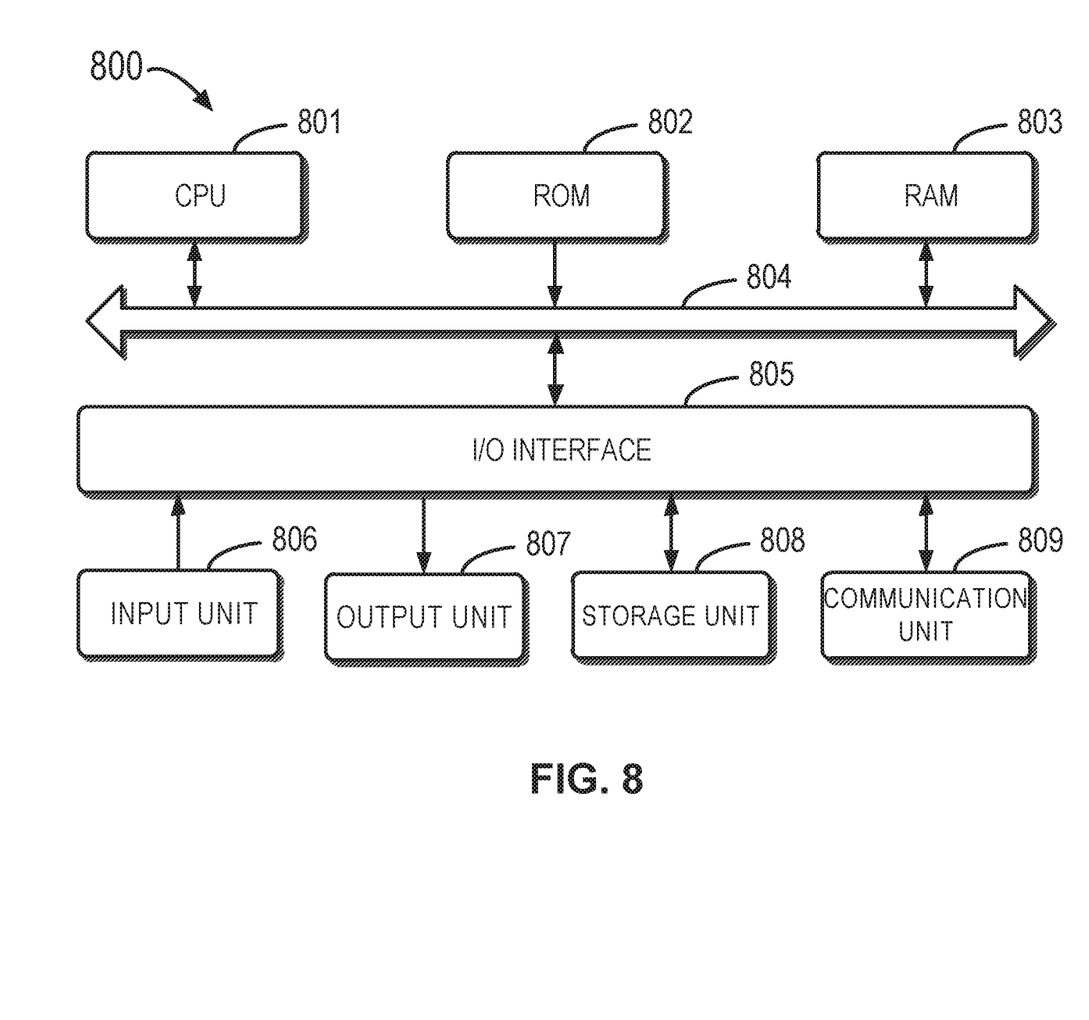
FIG. 8 illustrates a schematic block diagram of a device adapted to implement an embodiment of the present disclosure.

FIG. 8 illustrates a schematic block diagram of a device 800 adapted to implement an embodiment of the present disclosure. The device 800 may be the device or apparatus described by embodiments of the present disclosure. As shown in FIG. 8, the device 800 comprises a central processing unit (CPU) 801 that may perform various appropriate actions and processing based on computer program instructions stored in a read-only memory (ROM) 802 or computer program instructions loaded from a storage unit 808 to a random access memory (RAM) 803. In the RAM 803, there further store various programs and data needed for operations of the device 800. The CPU 801, ROM 802 and RAM 803 are connected to each other via a bus 804. An input/output (I/O) interface 805 is also connected to the bus 804.

Various components in the device 800 are connected to the I/O interface 805, including: an input unit 806 such as a keyboard, a mouse and the like; an output unit 807 including various kinds of displays and a loudspeaker and so on; a storage unit 808 including a magnetic disk, an optical disk, and so on; a communication unit 809 including a network card, a modem, and a wireless communication transceiver and so on. The communication unit 809 allows the device 800 to exchange information/data with other devices through a computer network such as the Internet and/or various kinds of telecommunications networks.

Various processes and processing described above may be executed by the processing unit 801. For example, in some embodiments, the method may be implemented as a computer software program that is tangibly embodied on a machine readable medium, such as the storage unit 808. In some embodiments, a part or all of the computer program may be loaded and/or mounted onto the device 800 via ROM 802 and/or communication unit 809. When the computer program is loaded to the RAM 803 and executed by the CPU 801, one or more steps of the method as described above may be executed.

In some embodiments, the method described above may be implemented as a computer program product. The computer program product may include a computer readable storage medium which carries computer readable program instructions for executing aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (such as light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

These computer readable program instructions may be provided to a processing unit of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of assigning tasks to dedicated processing resources, comprising:
    obtaining hardware information of each of a plurality of dedicated processing resources, the plurality of dedicated processing resources being assigned to a type of computing task, wherein the plurality of dedicated processing resources comprises a first dedicated processing resource and a second dedicated processing resource, and the hardware information comprises first hardware information of the first dedicated processing resource and second hardware information of the second dedicated processing resource;
    generating a first task based on the first hardware information and a second task based on the second hardware information, the first task and second task being generated by utilizing a first compilation rule and a second compilation rule based on the first hardware information and the second hardware information, respectively, the first hardware information indicating that the first dedicated processing resource enables a specific function, and the second hardware information indicating the second dedicated processing resource disables the specific function, wherein the first compilation rule is used to compile kernel codes associated with different hardware capabilities to be executed on a first type of a dedicated processing resource, and the second compilation rule is used to compile kernel codes associated with different hardware capabilities to be executed on a second type of dedicated processing resource; and
    responsive to compiling the kernel codes associated with different hardware capabilities to be executed on the first type of dedicated processing resource and the second type of dedicated processing resource, allocating the first task to the first dedicated processing resource and the second task to the second dedicated processing resource;
    wherein the dedicated processing resources comprise accelerators, and the first task and the second task are deep learning tasks, and the method further comprises:
    performing the deep learning tasks on the allocated first dedicated processing resource and the allocated second dedicated processing resource, respectively, based on the compiled kernel codes.

2. The method according to claim 1, wherein the obtaining hardware information of a plurality of dedicated processing resources comprises:
    obtaining high-performance computing tasks;
    allocating the plurality of dedicated processing resources to the high-performance computing tasks; and
    obtaining hardware information of each of the plurality of dedicated processing resources in real time.

3. The method according to claim 1, wherein the obtaining hardware information of a plurality of dedicated processing resources comprises:
    querying hardware information of each of the plurality of dedicated processing resources periodically;
    storing the queried hardware information into a database, the hardware information comprising an identifier, a type, and a performance parameter of each dedicated processing resource; and
    obtaining, from the database, the hardware information of the plurality of dedicated processing resources.

4. The method according to claim 1, wherein the generating a first task based on the first hardware information and a second task based on the second hardware information comprises:
    determining the first compilation rule and the second compilation rule based on the first hardware information and the second hardware information respectively, the first hardware information indicating that the first dedicated processing resource enables the specific function, and the second hardware information indicating the second dedicated processing resource disables the specific function; and
    generating the first task and the second task using the first compilation rule and the second compilation rule respectively.

5. The method according to claim 4, wherein the generating a first task based on a first hardware information and a second task based on a second hardware information further comprises:
  associating the first task with a first identifier of the first dedicated processing resource; and
  associating the second task with a second identifier of the second dedicated processing resource, each identifier comprising an Internet Protocol (IP) address and a local identification of each dedicated processing resource.

6. The method according to claim 1, further comprising:
  receiving, from the first dedicated processing resource, a first result for the first task;
  receiving, from the second dedicated processing resource, a second result for the second task; and
  combining the first result and the second result.

7. The method according to claim 1, wherein the plurality of dedicated processing resources further comprises a third dedicated processing resource of the same type as the second dedicated processing resource, wherein the assigning the second task to the second dedicated processing resource comprises:
  allocating the second task to the second dedicated processing resource and the third dedicated processing resource.

8. The method according to claim 1, wherein the dedicated processing resources comprise graphics processing units (GPUs).

9. A device of assigning tasks to dedicated processing resources, comprising:
  a processing unit; and
  a memory coupled to the processing unit and storing instructions thereon, the instructions, when executed by the processing unit, executing the acts comprising:
    obtaining hardware information of each of a plurality of dedicated processing resources, the plurality of dedicated processing resources being assigned to a type of computing task, wherein the plurality of dedicated processing resources comprises a first dedicated processing resource and a second dedicated processing resource, and the hardware information comprises first hardware information of the first dedicated processing resource and second hardware information of the second dedicated processing resource;
    generating a first task based on the first hardware information and a second task based on the second hardware information, the first task and second task being generated by utilizing a first compilation rule and a second compilation rule based on the first hardware information and the second hardware information, respectively, the first hardware information indicating that the first dedicated processing resource enables a specific function, and the second hardware information indicating the second dedicated processing resource disables the specific function, wherein the first compilation rule is used to compile kernel codes associated with different hardware capabilities to be executed on a first type of a dedicated processing resource, and the second compilation rule is used to compile kernel codes associated with different hardware capabilities to be executed on a second type of dedicated processing resource; and
    responsive to compiling the kernel codes associated with different hardware capabilities to be executed on the first type of dedicated processing resource and the second type of dedicated processing resource, allocating the first task to the first dedicated processing resource and the second task to the second dedicated processing resource;
    wherein the dedicated processing resources comprise accelerators, and the first task and the second task are deep learning tasks, and the acts further comprises:
      performing the deep learning tasks on the allocated first dedicated processing resource and the allocated second dedicated processing resource, respectively, based on the compiled kernel codes.

10. The device according to claim 9, wherein the obtaining hardware information of a plurality of dedicated processing resources comprises:
  obtaining high-performance computing tasks;
  allocating the plurality of dedicated processing resources to the high-performance computing tasks; and
  obtaining hardware information of each of the plurality of dedicated processing resources in real time.

11. The device according to claim 9, wherein the obtaining hardware information of a plurality of dedicated processing resources comprises:
  querying hardware information of each of the plurality of dedicated processing resources periodically;
  storing the queried hardware information into a database, the hardware information comprising an identifier, a type, and a performance parameter of each dedicated processing resource; and
  obtaining, from the database, the hardware information of the plurality of dedicated processing resources.

12. The device according to claim 9, wherein the generating a first task based on the first hardware information and a second task based on the second hardware information comprises:
  determining the first compilation rule and the second compilation rule based on the first hardware information and the second hardware information respectively, the first hardware information indicating that the first dedicated processing resource enables [[a]] the specific function, and the second hardware information indicating the second dedicated processing resource disables the specific function; and
  generating the first task and the second task using the first compilation rule and the second compilation rule respectively.

13. The device according to claim 12, wherein the generating a first task based on a first hardware information and a second task based on a second hardware information further comprises:
  associating the first task with a first identifier of the first dedicated processing resource; and
  associating the second task with a second identifier of the second dedicated processing resource, each identifier comprising an Internet Protocol (IP) address and a local identification of each dedicated processing resource.

14. The device according to claim 9, the acts further comprising:
  receiving, from the first dedicated processing resource, a first result for the first task;
  receiving, from the second dedicated processing resource, a second result for the second task; and
  combining the first result and the second result.

15. The device according to claim 9, wherein the plurality of dedicated processing resources further comprises a third dedicated processing resource of the same type as the second dedicated processing resource, wherein the assigning the second task to the second dedicated processing resource comprises:

allocating the second task to the second dedicated processing resource and the third dedicated processing resource.

16. The device according to claim 9, wherein the dedicated processing resources comprise graphics processing units (GPUs).

17. A computer program product that is tangibly stored on a non-transient computer readable medium and comprises computer-executable instructions, the computer-executable instructions, when executed, causing a computer to execute a method of assigning tasks to dedicated processing resources, comprising:

obtaining hardware information of each of a plurality of dedicated processing resources, the plurality of dedicated processing resources being assigned to a type of computing task, wherein the plurality of dedicated processing resources comprises a first dedicated processing resource and a second dedicated processing resource, and the hardware information comprises first hardware information of the first dedicated processing resource and second hardware information of the second dedicated processing resource;

generating a first task based on the first hardware information and a second task based on the second hardware information, the first task and second task being generated by utilizing a first compilation rule and a second compilation rule based on the first hardware information and the second hardware information, respectively, the first hardware information indicating that the first dedicated processing resource enables a specific function, and the second hardware information indicating the second dedicated processing resource disables the specific function, wherein the first compilation rule is used to compile kernel codes associated with different hardware capabilities to be executed on a first type of a dedicated processing resource, and the second compilation rule is used to compile kernel codes associated with different hardware capabilities to be executed on a second type of dedicated processing resource; and responsive to compiling the kernel codes associated with different hardware capabilities to be executed on the first type of dedicated processing resource and the second type of dedicated processing resource, allocating the first task to the first dedicated processing resource and the second task to the second dedicated processing resource;

wherein the dedicated processing resources comprise accelerators, and the first task and the second task are deep learning tasks, and the method further comprises:

performing the deep learning tasks on the allocated first dedicated processing resource and the allocated second dedicated processing resource, respectively, based on the compiled kernel codes.

18. The computer program product according to claim 17, wherein the obtaining hardware information of a plurality of dedicated processing resources comprises:

obtaining high-performance computing tasks;

allocating the plurality of dedicated processing resources to the high-performance computing tasks; and obtaining hardware information of each of the plurality of dedicated processing resources in real time.

19. The computer program product according to claim 17, wherein the obtaining hardware information of a plurality of dedicated processing resources comprises:

querying hardware information of each of the plurality of dedicated processing resources periodically;

storing the queried hardware information into a database, the hardware information comprising an identifier, a type, and a performance parameter of each dedicated processing resource; and obtaining, from the database, the hardware information of the plurality of dedicated processing resources.

20. The computer program product according to claim 17, wherein the generating a first task based on the first hardware information and a second task based on the second hardware information comprises:

determining the first compilation rule and the second compilation rule based on the first hardware information and the second hardware information respectively, the first hardware information indicating that the first dedicated processing resource enables the specific function, and the second hardware information indicating the second dedicated processing resource disables the specific function; and generating the first task and the second task using the first compilation rule and the second compilation rule respectively.

* * * * *

UNITED STATES PATENT AND TRADEMARK OFFICE
CERTIFICATE OF CORRECTION

Page 1 of 1

PATENT NO. : 11,163,610 B2
APPLICATION NO. : 16/415746
DATED : November 2, 2021
INVENTOR(S) : Junping Zhao et al.

It is certified that error appears in the above-identified patent and that said Letters Patent is hereby corrected as shown below:

In the Claims

Claim 12, Column 14, Line 38, please delete "enables a the" and insert therefor --enables the--

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*